United States Patent [19]
Lettmann

[11] Patent Number: 6,146,516
[45] Date of Patent: *Nov. 14, 2000

[54] METHOD AND DEVICE FOR THE REPAIR AND/OR TOUCH-UP OF SMALL SURFACE FLAWS IN A PRESS PLATE OR AN ENDLESS BAND FOR SURFACE-EMBOSSING OF PLASTIC-COATED WOODEN OR LAMINATED PANELS

[75] Inventor: Heinz-Peter Lettmann, Krefeld, Germany

[73] Assignee: Hueck Engraving GmbH, Viersen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,387

[22] PCT Filed: Nov. 11, 1996

[86] PCT No.: PCT/EP96/05022

§ 371 Date: Aug. 18, 1997

§ 102(e) Date: Aug. 18, 1997

[87] PCT Pub. No.: WO97/23331

PCT Pub. Date: Jul. 3, 1997

[30] Foreign Application Priority Data

Dec. 22, 1995 [DE] Germany ............................ 195 48 198

[51] Int. Cl.[7] ................................ C25D 5/02; C25D 3/12; C25D 3/38; B05D 1/38
[52] U.S. Cl. ........................ 205/115; 205/147; 205/211; 205/217; 205/270; 205/271; 205/291; 205/283; 427/259; 427/282; 427/328; 427/405; 427/142; 427/430.1; 204/485
[58] Field of Search ..................................... 427/259, 282, 427/287, 328, 405, 433, 430.1, 142; 204/485, 298.02, 623; 205/103, 115, 147, 211, 217, 218, 271, 291, 283, 270

[56] References Cited

U.S. PATENT DOCUMENTS

| | | | |
|---|---|---|---|
| 2,603,593 | 7/1952 | Blickensderfer | 205/115 |
| 2,698,832 | 1/1955 | Swanson | 205/115 |
| 2,776,255 | 1/1957 | Hammond et al. | 205/217 |
| 3,393,134 | 7/1968 | Schwartz | 204/16 |
| 3,616,285 | 10/1971 | Norris | 204/16 |
| 3,645,855 | 2/1972 | Wisman | 205/115 |
| 3,923,610 | 12/1975 | Bergin et al. | 204/32 R |
| 4,013,488 | 3/1977 | Ramqvist et al. | 148/143 |
| 4,738,756 | 4/1988 | Mseitif | 204/15 |
| 5,232,576 | 8/1993 | Matsumoto et al. | 205/284 |

*Primary Examiner*—Shrive Beck
*Assistant Examiner*—Michael Barr
*Attorney, Agent, or Firm*—Townsend and Townsend and Crew LLP

[57] ABSTRACT

A method and a device are described for the repair and/or touch-up of small surface flaws in large press plates or endless bands of sheet metal, especially steel sheet, having a structured metal coating and a hard-chrome plating for surface-embossing plastic-coated wooden or laminated panels. Each flaw is repaired by surrounding it with a mask, pickling, and galvanically metallizing it. For a simplified and cost-favorable repair or touch-up, a galvanic solution is applied to the masked and pickled flaw for microgalvanizing damaged areas smaller than 14 mm$^2$ by dipping the tip of an electrode into the solution. The pickled flaw can first be provided with a thin, microgalvanically applied nickel layer, and it is then copper-plated. The copper build-up is restructured by hand, if necessary, and covered with a hardened cobalt layer. A suitable microgalvanization device has a pole-reversible rectifier, an electrode with one tip that can be dipped into the pickling and/or galvanic solution, and an opposite-pole terminal for connection to the steel sheet.

14 Claims, No Drawings

METHOD AND DEVICE FOR THE REPAIR AND/OR TOUCH-UP OF SMALL SURFACE FLAWS IN A PRESS PLATE OR AN ENDLESS BAND FOR SURFACE-EMBOSSING OF PLASTIC-COATED WOODEN OR LAMINATED PANELS

The invention concerns a method and a device for the repair and/or touch-up of small surface flaws in a large press plate or an endless band of sheet metal, especially steel sheet, with a structured metal coating and a hard-chrome plating for surface-embossing plastic-coated wood material or laminated panels, each flaw being enclosed by a mask, pickled, and galvanically metallized. The invention also concerns the treatment of press plates or endless bands of steel sheet or brass sheet, which are directly structured on their surfaces.

BACKGROUND OF THE INVENTION

Plastic-coated wood or laminated panels, which are used, for example, in the production of furniture, usually have a structure embossed in their surfaces. The embossing of such a structure occurs by means of large-format press plates or endless bands. The press plates are made from either steel sheet or brass sheet that carries a surface structure, or of steel plate having a relatively soft copper or brass layer into which the surface structure is formed and that is subsequently hard-chrome plated. Such press plates are mounted in a pressing machine with which the plastic-coated furniture panels and the like are manufactured. For continuous production, presses are also known that have two revolving endless bands between which the material is pressed into panels. In both designs, the surfaces facing the panels have a structure which is embossed in the pressing laminate. Since surface flaws in the press plate or the endless band would also be embossed in the panel, flawless press plates or endless bands are needed for producing the wooden or laminated panels. However, it is not feasible to prevent all damage to the surfaces of the press plates or endless bands when used in pressing machines, or the occurrence of cracks, imprints, shrinkage cavities, and the like. Surface flaws of this type are generally very small and cover areas between 1 $mm^2$ and 14 $mm^2$. The flaws may occur in the steel sheet, in the structured metal coating applied to the sheets, in the hard-chrome layer, or in all layers.

Repair during the machining of the press plates or endless bands, and the touch-up of damaged press plates or bands while in the pressing machine, is difficult and expensive, or may not even be possible. If the damage involves steel sheets that have not yet been coated, flaws can be repaired with one or more etching processes. However, the resulting repair costs are about equal to or greater than the costs of new press plates or bands. Flaws that extend through the hard-chrome plating and the copper or brass layer into the steel sheet can be touched-up by completely stripping off the chromium plating and the copper or brass layer over the entire surface area and then re-applying the copper or brass and the chrome over the smoothed surface. However, this is too difficult and expensive.

Relatively large damaged surface areas of about 1 $cm^2$ and greater can be repaired using the so-called "tampon-galvanization" technique, in which, as is known, for example, from the LPW Handbook of Galvanization, Vol. 1, 1988, p. 472, an anode is connected to a tampon, which is impregnated with electrolyte. The tampon is constantly replenished with fresh electrolyte and must be constantly and vigorously moved. However, this approach does not lend itself to repairing small flaw areas between 1 $mm^2$ and 14 $mm^2$.

SUMMARY OF THE INVENTION

It is therefore an object of the invention to allow the repair and/or touch-up of small surface flaws in the press plates or endless bands in a cost-effective manner, so that the repaired and/or touched-up flaws can no longer be distinguished from the rest of the surface structure by either the naked eye or touching.

The method of the invention allows a very simple and economical local repair and/or touch-up of very small surface flaws in press plates or endless bands which cannot be touched-up with tampon galvanization. It can be implemented without large equipment expenditures.

DETAILED DESCRIPTION OF THE INVENTION

Initially, the flaw is surrounded with a mask made of a material which is inert to the material being handled, and which is glued on, for example. The mask shields the undamaged boundary zone of the flaw from the pickling and galvanic solutions. By subsequent pickling, the surface of the flaw is pretreated and roughened to obtain good adhesion for the microgalvanic metallization of the invention. The pickling, also known as activation, can be chemical and/or microgalvanic pickling, and a reversal of the poles of the microgalvanization device can be employed. Due to the microgalvanization according to the invention, even extremely small flaws of between 1 $mm^2$ and 14 $mm^2$ can be repaired. The corresponding microgalvanization or electroplating device comprises essentially a pole-reversible rectifier to generate the galvanization current, an electrode with a tip that can be dipped into the pickling or galvanic solution, and an opposite-pole terminal which can be connected to the pressing plate. The microgalvanic process permits local treatment of all minor surface flaws on press plates or endless bands.

A galvanic solution containing copper ions for microgalvanically copper-plating the damaged area, such as a high-performance liquid or gel copper electrolyte, is applied to the pickled and rinsed flaw. The electrode is dipped into the galvanic solution, or connected to it so as to carry a current, and the opposite-pole terminal is attached to the steel plate. Copper is deposited by a cathodic circuit. The deposition is continued and the galvanic solution is replenished as needed until the depression at the flaw is filled in.

To improve the adhesion of the copper-plating and form a diffusion barrier, a thin nickel layer of about 0.5 $\mu$m is microgalvanically applied to the pickled and rinsed flaw, which is then copper-plated.

The microgalvanic method of the invention can be used to advantageously touch-up press plates and endless bands during any stage of their manufacture. Already existing flaws in the rough steel plate can be copper-plated according to the invention. After planing the copper build-up, the flaw is eliminated and a copper or brass layer can then be applied over the entire touched-up steel plate, and the copper or brass layer surface is structured and hard-chrome plated in the usual manner.

If the flaw occurs in a press sheet or endless band that already has a structured copper or brass layer, but has not yet been hard-chrome plated, the built-up copper surface is restructured by hand to match it to the surrounding surface structure. After this, a full-coverage hard-chrome plating is performed. Finally, if surface flaws are noticed in a finished hard-chrome plated press plate or endless band, the restructured built-up copper surface is etched and a thin nickel layer is microgalvanically applied to form a diffusion barrier. Thereafter, a cobalt layer is deposited to form a hard layer over the touched-up flaw that has a flat contour and forms no edges.

Damaged press plates or endless bands installed and used in pressing machines can also be repaired according to the invention. This is done as in the case of damaged finished hard-chrome plated press plates or endless bands by microgalvanically applying a thin nickel layer over the flaw prior to copper plating.

The method of the invention can also be used to eliminate minor surface flaws in press plates or bands of steel sheet that have a surface structure formed directly in the surface of the plate or band without an intervening copper or brass layer. In such a case the flaw is copper-plated in identical fashion and the copper layer, after pickling, is microgalvanically cobaltized to provide the repaired flaw with a hardened surface layer.

Conventional pickling and galvanic solutions can be used for the microgalvanization of the invention. Suitable for pickling are, for example, sulfuric acid, sulfuric acid with hydrogen peroxide, sodium hydrogen fluoride, potassium hydroxide, or the like, in suitable aqueous dilution. For the copper, nickel, and cobalt treatments, solutions containing the respective metal ions can be used.

The following examples illustrate the invention in more detail:

EXAMPLE 1

A press plate having a nonstructured copper or brass layer, which has not yet been hard-chrome plated, is to be repaired.

At first, the damaged surface is cleaned with methanol. A mask is applied and adhered (e.g. glued) to the plate or band so that it surrounds the flaw and has an overlap that should not exceed 0.5 mm all around. Next, the flaw is etched or pickled with about 1 to 32 ml of a 15% solution of $H_2SO_4$ and $H_2O_2$ for 10–15 seconds. The pickling solution is then blotted up, 1 to 3 ml of a high-performance copper electrolyte is applied, and a microgalvanization device is attached, dipping the tip of a cathode-connected electrode of platinum/iridium into the electrolyte. With a current density of about 1 $mA/mm^2$, the copper layer grows at about 1.5 $\mu m$ per minute. When the depression of the flaw is filled with copper, the electrolyte is blotted up, the mask removed, and the copper-plated flaw is thoroughly washed.

The repaired copper-plated press sheet is then structured and hard-chrome plated over its entire area in a conventional manner.

EXAMPLE 2

A press plate with a structured copper or brass layer and a hard-chrome plating is to be repaired.

The damaged surface is first masked according to Example 1. For microgalvanic pickling, a 5% sodium hydrogen fluoride solution is employed and the microgalvanization device is put in place. The electrode is dipped into the pickling solution and first anodically connected for about 10–15 seconds and then cathodically connected for about 20 seconds, employing a current density of about 4 $mA/mm^2$. Thereafter, a thin nickel layer of about 0.5 $\mu m$ is microgalvanically applied to the washed surface of the flaw. A nickel-strike electrolyte is used. The current density is about 3 $mA/mm^2$ and the length of the treatment is about 60 seconds. The flaw is thereafter copper-coated according to Example 1. The built-up copper surface is then restructured by hand and matched to the surrounding structure.

Finally, a hardened layer of cobalt is applied to the surface of the restructured copper. For this, the built-up copper surface is galvanically pickled as was already described and provided with a thin nickel layer of about 0.5 $\mu m$. A high-performance cobalt electrolyte is used for microgalvanic cobalt-plating. The current density is about 1 $mA/mm^2$ and the cobalt layer grows about 2 $\mu m$/minute.

A press plate damaged in the pressing machine can be touched-up in a similar fashion, in which case only the damaged surface area is provided with a thin nickel layer as a diffusion barrier prior to the copper build-up.

EXAMPLE 3

A steel press plate on which the steel surface is directly structured is to be repaired.

First, the flaw is microgalvanically copper-plated according to Example 2. The copper-plated surface is then restructured by hand. Thereafter, the entire surface of the press plate is hard-chrome plated.

EXAMPLE 4

A steel press plate on which the steel surface is structured and which has no hard-chrome plating is to be touched-up.

The flaw is copper-plated according to Example 2, and the built-up copper surface is restructured by hand. The restructured copper surface is then microgalvanically provided with a hard cobalt layer according to Example 2.

Endless bands can also be repaired or touched-up according to the examples. Likewise, the method of the invention is suitable for repairing or touching-up press plates or endless bands of other metals and alloys, e.g., brass, as well as other metal coatings. In such events, the pickling and galvanization conditions are suitably adapted to the material of the plate and/or the plated layers.

What is claimed is:

1. A method for repairing and/or touching up surface flaws each having a damaged area smaller than 14 $mm^2$ in a press plate or an endless band of sheet metal which is substantially larger than the surface flaws, the press plate or endless band of sheet metal having a structured metal coating and a hard-chrome plating for surface-embossing plastic-coated wooden or laminated panels, the method comprising surrounding each surface flaw with a mask; pickling the flaw; applying a galvanic solution to the surrounded and pickled flaw; dipping an electrode tip into the applied galvanic solution, microgalvanically applying a nickel layer to the pickled flaw and copper-plating the pickled flaw to cover the flaw, and, after the copper-plating, providing the press plate or the endless band with a full-coverage copper or brass layer; structuring the copper or brass layer; and hard-chrome plating the entire copper or brass layer, wherein the maximum amount of the galvanic solution applied for each flaw is 3 ml and the electrode tip is sufficiently small to be dipped into the applied galvanic solution.

2. The method according to claim 1 wherein the amount of the galvanic solution applied for each flaw is 1–3 ml.

3. The method according to claim 1 wherein the galvanic solution comprises a nickel-strike electrolyte.

4. The method according to claim 1 wherein the electrode tip has a current density of about 4 $mA/mm^2$.

5. The method according to claim 1 wherein the electrode tip has a current density of about 1 mA/mm².

6. The method according to claim 1 further comprising restructuring the surface of built-up copper areas from copper-plating the pickled flaw.

7. The method according to claim 6 wherein the restructuring occurs before the hard-chrome plating.

8. The method according to claim 6 further comprising pickling the restructured surface of the built-up copper areas; and thereafter microgalvanically applying on the pickled surface first a nickel layer and then a cobalt layer.

9. The method according to claim 1 wherein the full-coverage layer is a brass layer.

10. A method for repairing and/or touching up surface flaws each having a damaged area smaller than 14 mm² in a press plate or an endless band of sheet metal which is substantially larger than the surface flaws, the press plate or endless band of sheet metal having a structured surface for surface-embossing plastic-coated wooden or laminated panels, the method comprising surrounding each surface flaw with a mask; pickling the flaw; microgalvanically copper-plating the flaw to cover the flaw; pickling the microgalvanically copper-plated flaw; microgalvanically cobaltizing the pickled copper-plated flaw, and providing the press plate or the endless band with a full-coverage copper or brass layer; structuring the copper or brass layer; and hard-chrome plating the entire copper or brass layer, wherein the microgalvanically copper-plating and cobaltizing steps are each performed by applying a maximum amount of 3 ml of a galvanic solution to each flaw, providing an electrode tip which is sufficiently small to be dipped into the applied galvanic solution, and dipping the electrode tip into the applied galvanic solution.

11. The method according to claim 10 wherein the microgalvanically copper-plating step comprises applying a maximum amount of 3 ml of a galvanic solution having a copper electrolyte to each surrounded and pickled flaw.

12. The method according to claim 10 wherein the microgalvanically cobaltizing step comprises applying a maximum amount of 3 ml of a galvanic solution having a cobalt electrolyte to each surrounded and pickled flaw.

13. The method according to claim 10 wherein the pickling steps are performed using at least one of sulfuric acid, sulfuric acid with hydrogen peroxide, sodium hydrogen fluoride, and potassium hydroxide.

14. The method according to claim 10 wherein the full-coverage layer is a brass layer.

* * * * *